United States Patent
Yang et al.

(10) Patent No.: US 9,319,496 B2
(45) Date of Patent: Apr. 19, 2016

(54) MOBILE PHONE CASE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Gang Yang, Beijing (CN); Hongkun Zhang, Beijing (CN); Rui Li, Beijing (CN); Changwu Dai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/499,855

(22) Filed: Sep. 29, 2014

(65) Prior Publication Data
US 2015/0381779 A1    Dec. 31, 2015

(30) Foreign Application Priority Data
Jun. 25, 2014   (CN) .......................... 2014 1 0291107

(51) Int. Cl.
H04M 1/02     (2006.01)
H04B 1/38     (2015.01)
H04B 1/3888   (2015.01)
A45C 11/00    (2006.01)

(52) U.S. Cl.
CPC ........... *H04M 1/0202* (2013.01); *H04B 1/3888* (2013.01); *A45C 2011/002* (2013.01)

(58) Field of Classification Search
CPC .............. H04M 1/0283; H04B 1/3888; A45C 2011/002; A45C 2011/0023
See application file for complete search history.

(56) References Cited

U.S. PATENT DOCUMENTS

| | | | | |
|---|---|---|---|---|
| 6,374,089 | B1 * | 4/2002 | Till ...................... | H04M 1/0216 455/128 |
| 2009/0166563 | A1 * | 7/2009 | Yokoyama ............ | C23C 14/048 250/492.1 |
| 2013/0162933 | A1 * | 6/2013 | Hou ................... | G02F 1/133528 349/65 |
| 2013/0300679 | A1 * | 11/2013 | Oh ......................... | A45C 11/00 345/173 |
| 2013/0300985 | A1 * | 11/2013 | Bulda ................... | G02F 1/1323 349/86 |

FOREIGN PATENT DOCUMENTS

CN           201957082 U   *   8/2011

* cited by examiner

*Primary Examiner* — Michael Mapa
*Assistant Examiner* — Martin Chang
(74) *Attorney, Agent, or Firm* — Nath, Goldberg & Meyer; Joshua B. Goldberg

(57) ABSTRACT

The present invention discloses a mobile phone case. The mobile phone case comprises a base plate for fixing a mobile phone, a top cover for protecting the display surface of the mobile phone and a first connection member for connecting the base plate and the top cover, wherein, the mobile phone case further comprises at least one light-shielding film, arranged between the base plate and the top cover and with one side connected with the first connection member, and the light-shielding film is used for shielding a part of rays of light generated by the display surface so as to limit a visual angle of the display surface. The mobile phone case provided by the present invention can not only decorate and protect the mobile phone, but also effectively prevent displayed information of the display surface of the mobile phone from leaking.

7 Claims, 4 Drawing Sheets

MOBILE PHONE CASE

FIELD OF THE INVENTION

The present invention relates to a mobile phone accessory, and particularly relates to a mobile phone case.

BACKGROUND OF THE INVENTION

With the rapid development of economy and the improvement of the living standards of people, mobile phones have entered thousands of households, and mobile phone cases are available subsequently. The mobile phone cases are usually used for decorating the mobile phones and preventing the mobile phones from being damaged due to collisions. Therefore, the mobile phone cases in the prior art are relatively single in functions.

SUMMARY OF THE INVENTION

The present invention provides a mobile phone case, which can not only decorate and protect a mobile phone, but also effectively prevent displayed information on a display surface of the mobile phone from leaking.

In order to realize the above purpose, the present invention provides a mobile phone case, comprising: a base plate for fixing a mobile phone, a top cover for protecting a display surface of the mobile phone and a first connection member for connecting the base plate and the top cover, wherein the mobile phone case further comprises at least one light-shielding film arranged between the base plate and the top cover and with one side connected with the first connection member, and the light-shielding film is used for shielding a part of rays of light generated by the display surface so as to limit a visual angle of the display surface.

Optionally, the light-shielding film comprises a transparent substrate and a plurality of light-shielding sheets arranged in parallel, the plurality of light-shielding sheets are formed on the transparent substrate, and the plurality of light-shielding sheets and the transparent substrate form a predetermined angle.

Optionally, the predetermined angle is 60-90 degrees.

Optionally, the predetermined angle is 90 degrees.

Optionally, the mobile phone case comprises one light-shielding film, and the light-shielding sheets in the light-shielding film are transversally arranged extending along a length direction of the first connection member or longitudinally arranged perpendicular to the length direction of the first connection member.

Optionally, the mobile phone case comprises two light-shielding films, the light-shielding sheets in one of the light-shielding films are transversally arranged extending along a length direction of the first connection member, and the light-shielding sheets in the other of the light-shielding films are longitudinally arranged perpendicular to the length direction of the first connection member.

Optionally, a distance between any two adjacent light-shielding sheets is 0.05-0.07 mm.

Optionally, said one side of the light-shielding film is connected with the first connection member through a second connection member, which comprises a fixed part and a rotary part provided with an open slot, the fixed part is connected with said one side of the light-shielding film to fix the light-shielding film, the rotary part is connected with the first connection member to rotate round the first connection member, and the fixed part is arranged within the open slot so as to be clamped with the rotary part.

Optionally, a section shape of the fixed part is a circle, and a section shape of the rotary part is a major arc.

Optionally, a thickness of the light-shielding film is 1-2 mm.

The present invention has the following beneficial effects:

the present invention provides a mobile phone case, which comprises a base plate, a top cover, a first connection member and at least one light-shielding film, the light-shielding film is used for shielding a part of rays of light generated by the display surface of a mobile phone so as to limit the visual angle of the display surface, thus the influence of the rays of light generated by the display surface on other people can be avoided, and other people can be prevented from prying the displayed information of the display surface of the mobile phone from a side. Meanwhile, the mobile phone case further comprises a second connection member, which comprises a fixed part and a rotary part provided with an open slot, wherein the fixed part is fixed with one side of the light-shielding film, and is arranged within the open slot so as to be clamped with the rotary part, thus the light-shielding film can rotate round the first connection member, which facilitates the operation of a user, and moreover, because the fixed part and the rotary part may be correspondingly assembled or disassembled according to use needs, the replacement of the light-shielding film by the user is facilitated.

DETAILED DESCRIPTION OF THE EMBODIMENTS

To make a person skilled in the art better understand the technical solution of the present invention, the mobile phone case provided by the present invention will be described in detail below in conjunction with the accompanying drawings.

Figure 1:
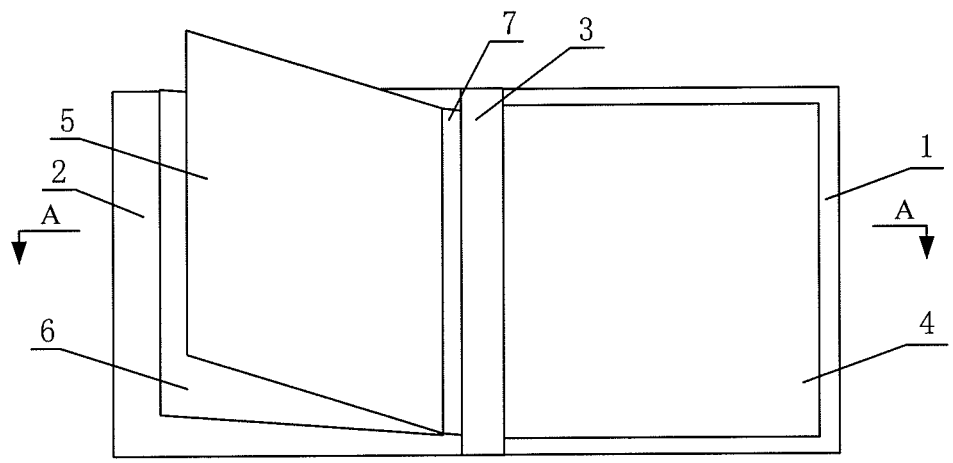
FIG. 1 is a schematic diagram of a structure of a mobile phone case provided by an embodiment of the present invention.
Figure 2:
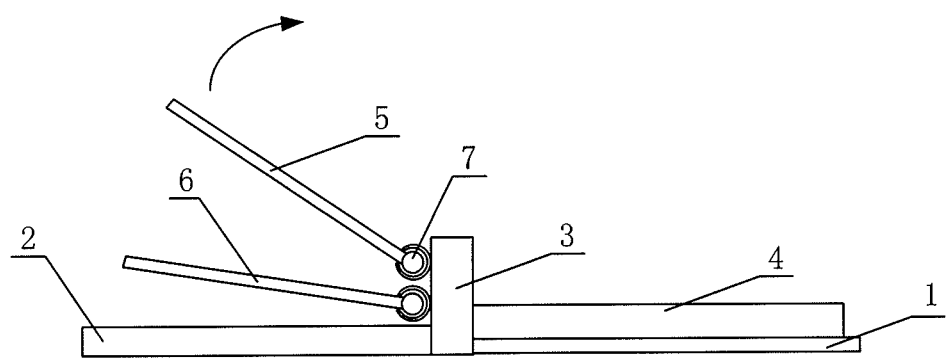
FIG. 2 is a sectional view in the A-A direction of the mobile phone case shown in FIG. 1.

FIG. 1 is a schematic diagram of a structure of a mobile phone case provided by an embodiment of the present invention, and FIG. 2 is a sectional view in the A-A direction of the mobile phone case shown in FIG. 1. As shown in FIGS. 1 and 2, the mobile phone case comprises a base plate 1 for fixing a mobile phone 4, a top cover 2 for protecting a display surface of the mobile phone 4 and a first connection member 3 for connecting the base plate 1 and the top cover 2, the length direction of the first connection member 3 is in the direction of the joint line of the base plate 1 and the top cover 2 (that is, a direction perpendicular to the A-A direction in FIG. 1), the width direction of the first connection member 3 is in the A-A direction shown in FIG. 1, and the height of the first connection member 3 is perpendicular to the base plate 1. The mobile phone case further comprises two light-shielding films 5 and 6, each of which is arranged between the base plate 1 and the top cover 2, and has one side connected with the first connection member 3, and the light-shielding films 5 and 6 are used for shielding a part of the rays of light generated by the display surface of the mobile phone 4.

It should be noted that, the situation that the mobile phone case shown in FIGS. 1 and 2 comprises two light-shielding films is a preferred embodiment of the present invention, and does not limit the technical solutions of the present invention. Actually, the object of the present invention may also be realized by arranging only one light-shielding film 5 or 6. In this case, the light-shielding film 5 or 6 is arranged between the base plate 1 and the top cover 2, one side thereof is connected with the first connection member 3, and the light-shielding film 5 or 6 is used for shielding a part of the rays of light generated by the display surface of the mobile phone 4.

Here, the top cover 2 is used for sheltering the display surface of the mobile phone so as to avoid damages to the mobile phone, the connection between the top cover 2 and the base plate 1 may be a flexible connection (that is, the connection is carried out by using a flexible material), a pivot connection and the like, and the connection may also be carried out in a manner in which the light-shielding film is connected as described below. The present invention does not limit the manner When the display surface of the mobile phone 4 is not covered by the light-shielding film 5 or 6, the rays of light generated by the display surface are scattered towards the surrounding, at this moment, a user can observe the displayed information of the display surface from any angle in front of the display surface. In the present invention, by arranging at least one light-shielding film in the mobile phone case, the light-shielding film can shield a part of the rays of light generated by the display surface of the mobile phone 4 when the light-shielding film is arranged above the display surface, so as to limit the visual angle of the display surface.

The mobile phone case provided by the present invention can not only decorate and protect the mobile phone 4, but also limit the visual angle of the display surface of the mobile phone 4 in special occasions. For example, in an environment required to keep a low brightness, such as a movie theatre, the mobile phone case can shield a part of the rays of light generated by the display surface of the mobile phone 4, thus avoiding the influence of the scattered rays of light generated by the display surface of the mobile phone 4 on other people; and in a public place such as a subway, the mobile phone case can limit the visual angle of the display surface, thus preventing other people from prying the displayed information of the display surface of the mobile phone 4 from a side. Therefore, compared to the mobile phone cases in the prior art, the mobile phone case provided by the embodiment has more powerful functions, thus the practicability of the mobile phone case is further enhanced.

Figure 3:
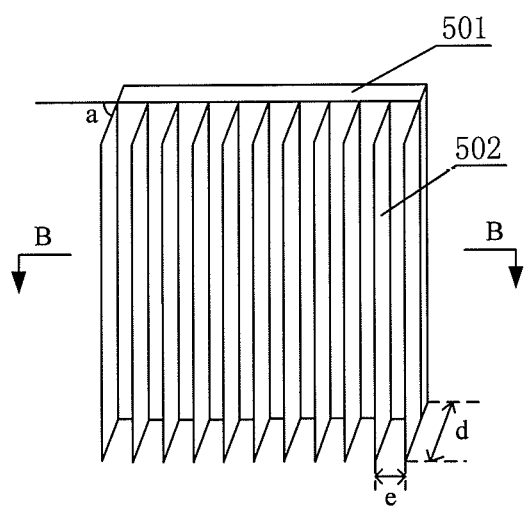
FIG. 3 is a schematic diagram of a light-shielding film in the present invention.

FIG. 3 is a schematic diagram of a structure of a light-shielding film in the present invention. In the embodiment, the light-shielding film 5 comprises a transparent substrate 501 and a plurality of light-shielding sheets 502 which are arranged in parallel, the light-shielding sheets 502 are formed on the transparent substrate 501, and the light-shielding sheets 502 and the transparent substrate 501 form a predetermined angle $\alpha$. Here, optionally, the thickness d of the light-shielding film is 1-2 mm, and distance e between any two adjacent light-shielding sheets 502 in the light-shielding film is 0.05-0.07 mm. In the present invention, all the light-shielding sheets 502 form a barrier structure, the light-shielding sheets 502 and the display surface also form the predetermined angle $\alpha$, and the light-shielding sheets 502 can shield a part of the rays of light generated by the display surface so as to limit the visual angle of the display surface.

In the embodiment, in order to guarantee that the user can obtain the displayed information of the display surface normally, the range of the predetermined angle $\alpha$ formed by the light-shielding sheets 502 and the transparent substrate 501 is 60-90 degrees. It should be noted that, when the thickness of the light-shielding film is fixed and the thickness of the transparent substrate is also fixed, the larger the predetermined angle $\alpha$ is, the larger the visual angle of the display surface is.

Further, when the user views the display surface of the mobile phone 4, the line of sight of the user is always perpendicular to the display surface of the mobile phone 4, and in consideration of the above habit of the user, in the embodiment, preferably, the predetermined angle $\alpha$ formed by the light-shielding sheets 502 and the transparent substrate 501 is 90 degrees.

Figure 4A:
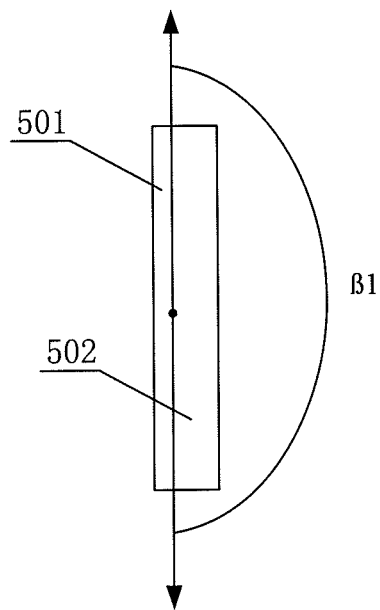
FIG. 4*a* is a side view of the light-shielding film shown in FIG. 3.
Figure 4B:
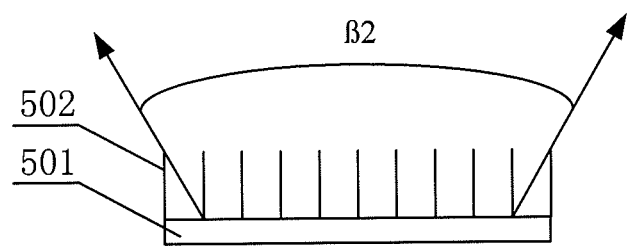
FIG. 4*b* is a sectional view in the B-B direction of the light-shielding film shown in FIG. 3.

In the light-shielding film shown in FIG. 3, the predetermined angle $\alpha$ formed by the light-shielding sheets 502 and the transparent substrate 501 is 90 degrees, and the light-shielding sheets 502 are longitudinally arranged, that is, arranged along the A-A direction. FIG. 4a is a side view of the light-shielding film shown in FIG. 3, and FIG. 4b is a sectional view in the B-B direction of the light-shielding film shown in FIG. 3. As shown in FIGS. 4a and 4b, when the light-shielding film shown in FIG. 3 is arranged above the display surface of the mobile phone 4, the light-shielding film can limit the transversal light-emitting range of the display surface, the transversal visual angle of the display surface is $\beta 2$, which is obviously less than 180 degrees; however, the light-shielding film cannot limit the longitudinal light-emitting range of the display surface, the longitudinal visual angle of the display surface is $\beta 1$, which is equal to or approximate to 180 degrees.

Figure 5:
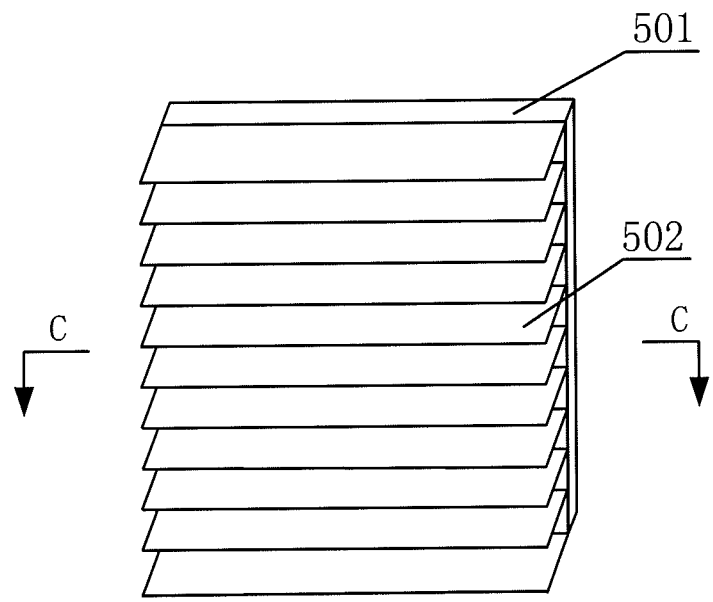
FIG. 5 is a schematic diagram of a light-shielding film in which light-shielding sheets are transversally arranged.
Figure 6A:
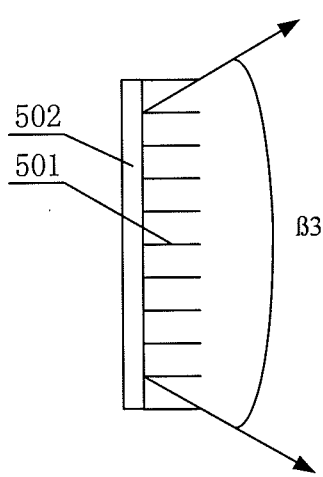
FIG. 6*a* is a side view of the light-shielding film shown in FIG. 5.
Figure 6B:
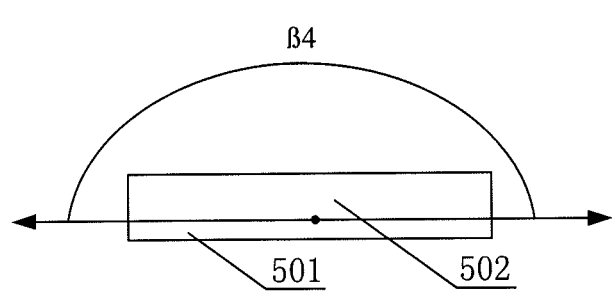
FIG. 6*b* is a sectional view in the C-C direction of the light-shielding film shown in FIG. 5.

FIG. 5 is a schematic diagram of a light-shielding film in which light-shielding sheets are transversally arranged (that is, arranged along a direction perpendicular to the A-A direction), FIG. 6a is a side view of the light-shielding film shown in FIG. 5, and FIG. 6b is a sectional view in the C-C direction of the light-shielding film shown in FIG. 5. As shown in FIGS. 5, 6a and 6b, in the light-shielding film shown in FIG. 5, the predetermined angle $\alpha$ formed by the light-shielding sheets 502 and the transparent substrate 501 is 90 degrees, and the light-shielding sheets 502 are transversally arranged, when the light-shielding film shown in FIG. 5 is arranged above the display surface of the mobile phone 4, the light-shielding film cannot limit the transversal light-emitting range of the display surface, the transversal visual angle of the display surface is $\beta 4$, which is equal to or approximate to 180 degrees; however, the light-shielding film can limit the longitudinal light-emitting range of the display surface, the longitudinal visual angle of the display surface is $\beta 3$, which is obviously less than 180 degrees.

As an optional solution of the present invention, when the mobile phone case comprises one light-shielding film, the light-shielding film may use the light-shielding film shown in FIG. 3 or the light-shielding film shown in FIG. 5.

As another optional solution of the present invention, referring to FIGS. 1 and 2, when the mobile phone case comprises two light-shielding films, one light-shielding film may be the one shown in FIG. 3 (the light-shielding sheets 502 are longitudinally arranged), and the other light-shielding film may be the one shown in FIG. 5 (the light-shielding sheets 502 are transversally arranged). When the light-shielding film shown in FIG. 3 and the light-shielding film shown in FIG. 5 are used together, both the transversal visual angle and the longitudinal visual angle of the display surface may be limited. It should be noted that, when the mobile phone case comprises two light-shielding films, in order to avoid influence on the picture display of the display surface, the distance between any two adjacent light-shielding sheets 502 in each light-shielding film should be the maximum, that is, 0.07 mm. It should be noted that, in FIGS. 1 and 2, the technical solution in which the light-shielding film with the transversally-arranged light-shielding sheets 502 is arranged between the top cover and the light-shielding film with the longitudinally-arranged light-shielding sheets 502 does not limit the technical solutions of the present invention, and the relative positions of the two light-shielding films can be exchanged in the present invention.

Figure 7:
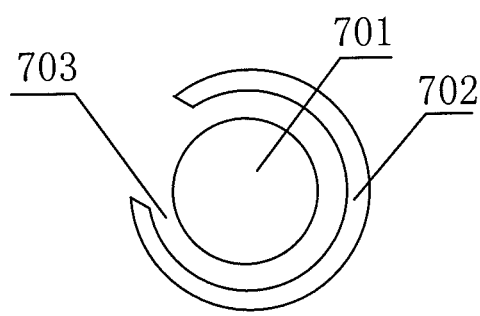
FIG. 7 is a schematic diagram of a structure of a second connection member in the present invention.

The mobile phone case of the present invention may further comprise a second connection member 7 used for connecting the light-shielding film to the mobile phone case. FIG. 7 is a schematic diagram of a structure of a second connection member of an embodiment of the present invention, as shown in FIGS. 2 and 7, in the embodiment, a side of the light-shielding film 5 or 6 is connected with the first connection member 3 through the second connection member 7. Specifically, the second connection member 7 comprises a fixed part 701 and a rotary part 702 provided with an open slot 703, the fixed part 701 is connected with the side of the light-shielding film to fix the light-shielding film, the rotary part 702 is connected with the first connection member 3 and rotates round the first connection member 3, and the fixed part 701 is arranged within the open slot 703 so as to be clamped with the rotary part 702. After the fixed part 701 is clamped with the rotary part 702 and when the rotary part 702 rotates round the first connection member 3, the light-shielding film may also be driven to rotate. Therefore, when the user needs to use the light-shielding film, the light-shielding film is directly rotated to be above the display surface of the mobile phone 4. As a preferred solution, the section shape of the fixed part 701 is a circle, and the section shape of the rotary part 702 is a major arc. With the above structure, the user can easily clamp or detach the fixed part 701 and the rotary part 702 according to wording environment. As an optional solution, the mobile phone case comprises a plurality of different light-shielding films, on each of which a fixed part 701 is correspondingly arranged, and the user can select the corresponding light-shielding film according to working environment and assemble the corresponding light-shielding film on the rotary part 702 for use.

The embodiments of the present invention provide a mobile phone case, which comprises a base plate, a top cover, a first connection member and at least one light-shielding film, wherein the light-shielding film is used for shielding a part of the rays of light generated by the display surface of a mobile phone so as to limit the visual angle of the display surface, thus the influence of the rays of light generated by the display surface on other people can be avoided, and other people are prevented from prying the displayed information of the display surface of the mobile phone from a side. Meanwhile, the mobile phone case further comprises a second connection member 7, which comprises a fixed part 701 and a rotary part 702 provided with an open slot, wherein the fixed part 701 is fixed with one side of the light-shielding film, and is arranged within the open slot so as to be clamped with the rotary part 702, thus the light-shielding film can rotate round the first connection member, which facilitates the operation of a user, and moreover, because the fixed part 701 and the rotary part 702 can be correspondingly assembled or disassembled according to use needs, the replacement of the light-shielding film by the user is facilitated. Compared with the mobile phone cases in the prior art, the mobile phone case provided by the embodiments of the present invention has more powerful functions and higher practicability.

It can be understood that, the foregoing implementations are merely specific implementations adopted for illustrating the principle of the present invention, but the protection scope of the present invention is not limited thereto. Various variations and improvements could be made by the person of ordinary skill in the art without departing from the spirit and essence of the present invention, and these variations and improvements are also deemed as the protection scope of the present invention.

The invention claimed is:

1. A mobile phone case, comprising:
   a base plate for fixing a mobile phone;
   a top cover for protecting a display surface of the mobile phone; and
   a first connection member for connecting the base plate and the top cover;
   wherein the mobile phone case further comprises at least one light-shielding film arranged between the base plate and the top cover and with one side connected with the first connection member, and the light-shielding film is used for shielding a part of rays of light generated by the display surface so as to limit a visual angle of the display surface;
   wherein the light-shielding film comprises a transparent substrate and a plurality of light-shielding sheets arranged in parallel, the plurality of light-shielding sheets are formed on the transparent substrate, and the plurality of light-shielding sheets and the transparent substrate form a predetermined angle; and
   wherein the mobile phone case comprises two light-shielding films, wherein the light-shielding sheets in one of the light-shielding films are transversally arranged extending along a length direction of the first connection member, and the light-shielding sheets in the other of the light-shielding films are longitudinally arranged perpendicular to the length direction of the first connection member.

2. The mobile phone case according to claim 1, wherein the predetermined angle is 60-90 degrees.

3. The mobile phone case according to claim 2, wherein the predetermined angle is 90 degrees.

4. The mobile phone case according to claim 1, wherein a distance between any two adjacent light-shielding sheets is 0.05-0.07 mm.

5. The mobile phone case according to claim 1, wherein said one side of the light-shielding film is connected with the first connection member through a second connection member, which comprises a fixed part and a rotary part provided with an open slot, the fixed part is connected with said one side of the light-shielding film to fix the light-shielding film, the rotary part is connected with the first connection member to rotate round the first connection member, and the fixed part is arranged within the open slot so as to be clamped with the rotary part.

6. The mobile phone case according to claim 5, wherein a section shape of the fixed part is a circle, and a section shape of the rotary part is a major arc.

7. The mobile phone case according to claim 1, wherein a thickness of the light-shielding film is 1-2 mm.

* * * * *